Jan. 1, 1935.  A. J. SMITH  1,986,765
APPARATUS FOR FABRICATING GLASSWARE
Filed Sept. 4, 1930  7 Sheets-Sheet 1

Witness:
A. A. Horn

Inventor
Algy J. Smith
by Brown & Parham
Attorneys.

Jan. 1, 1935. A. J. SMITH 1,986,765
APPARATUS FOR FABRICATING GLASSWARE
Filed Sept. 4, 1930 7 Sheets-Sheet 2

Witness:
A. A. Horn

Inventor
Algy J. Smith
by Brown & Parham
Attorneys.

Jan. 1, 1935.  A. J. SMITH  1,986,765
APPARATUS FOR FABRICATING GLASSWARE
Filed Sept. 4, 1930   7 Sheets-Sheet 3
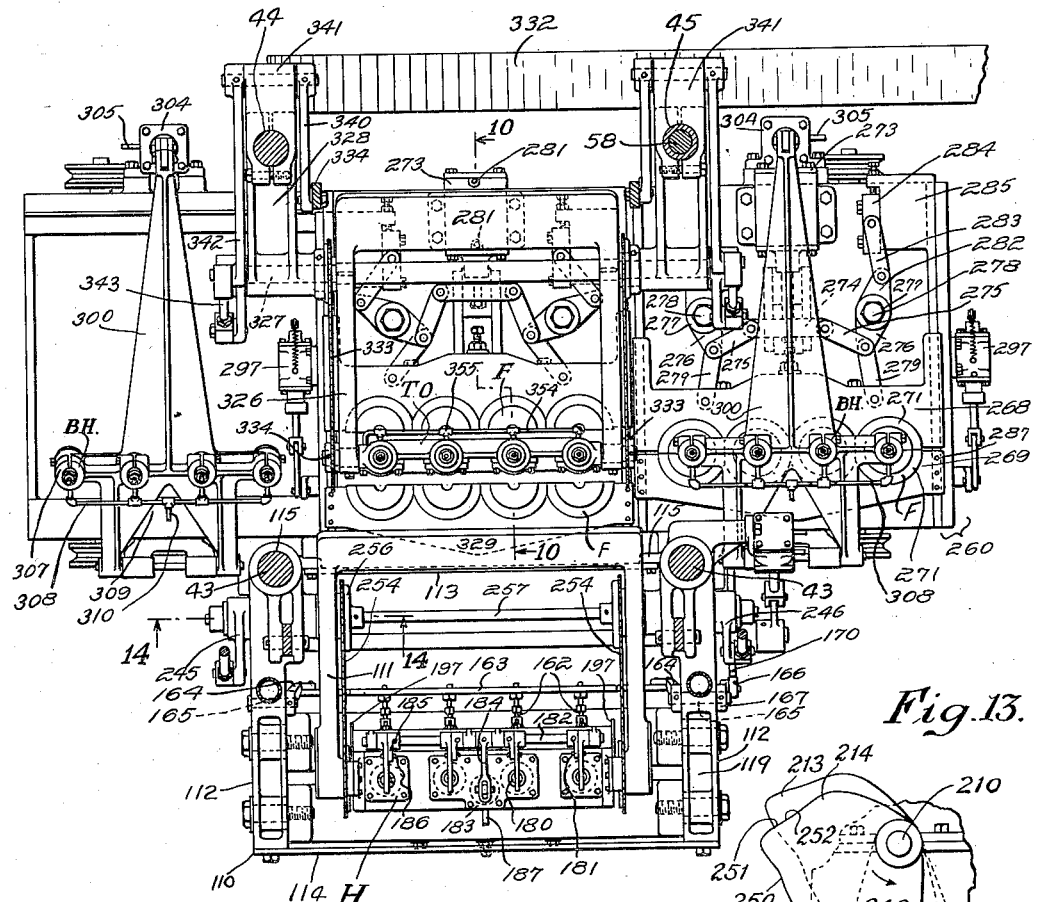
Fig.3.
Fig.13.
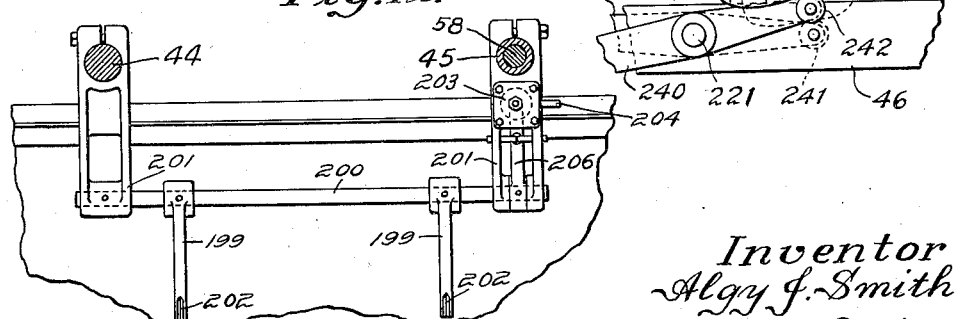
Fig.12.
Witness:
A. A. Horn
Inventor
Algy J. Smith
by Brown & Parham
Attorneys.

Jan. 1, 1935.    A. J. SMITH    1,986,765
APPARATUS FOR FABRICATING GLASSWARE
Filed Sept. 4, 1930    7 Sheets-Sheet 4
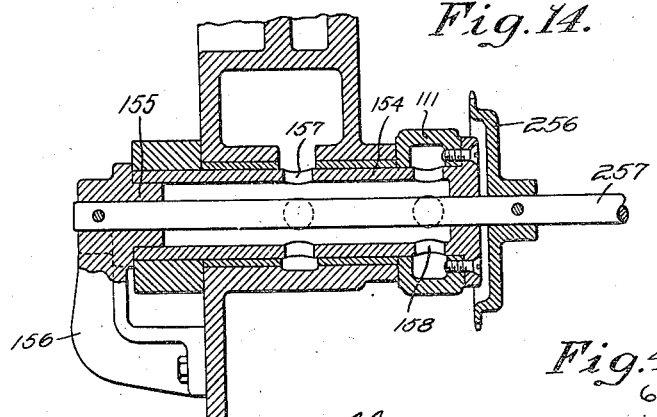
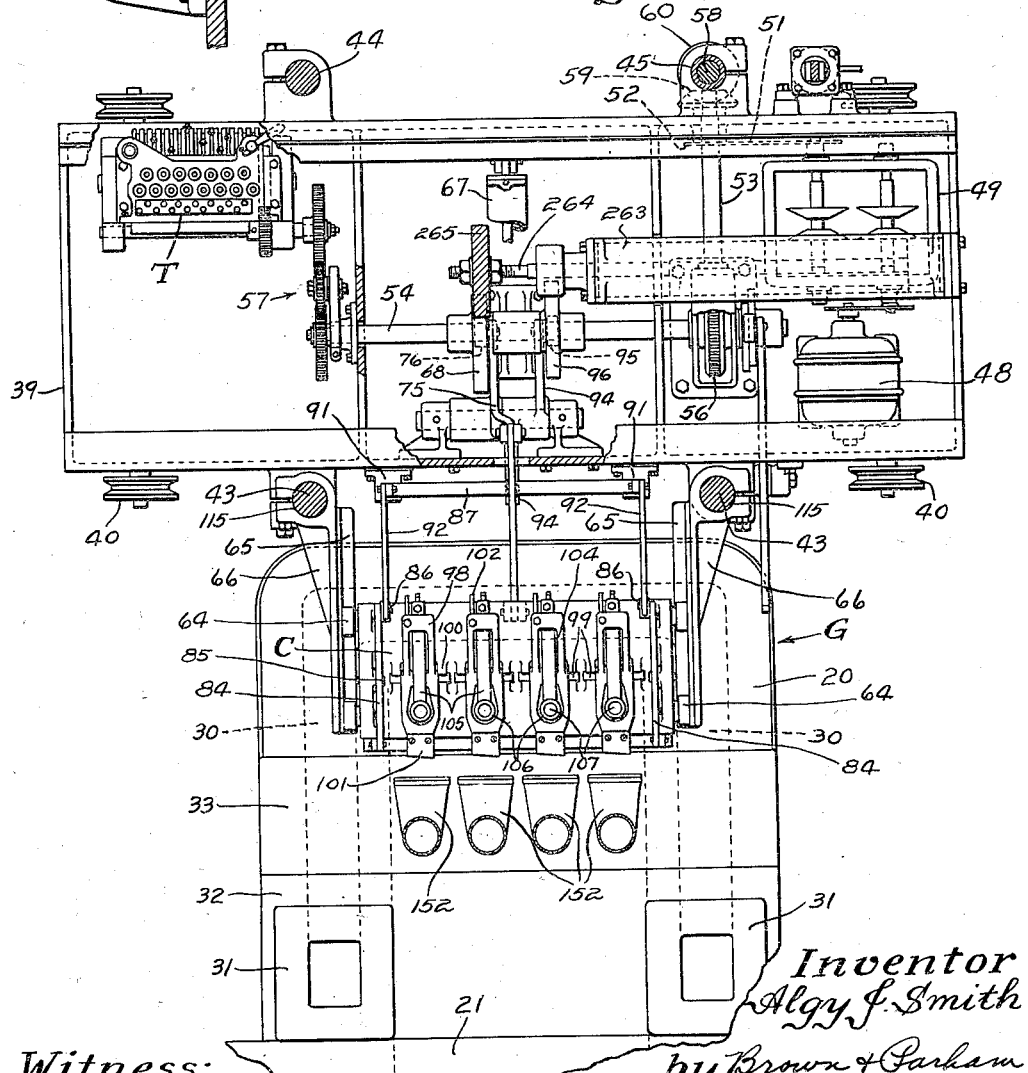
Witness:
A. A. Horn
Inventor
Algy J. Smith
by Brown & Parham
Attorneys.

Jan. 1, 1935.  A. J. SMITH  1,986,765
APPARATUS FOR FABRICATING GLASSWARE
Filed Sept. 4, 1930  7 Sheets-Sheet 5

Witness:
A. A. Horn

Inventor
Algy J. Smith
by Brown + Parham
Attorneys.

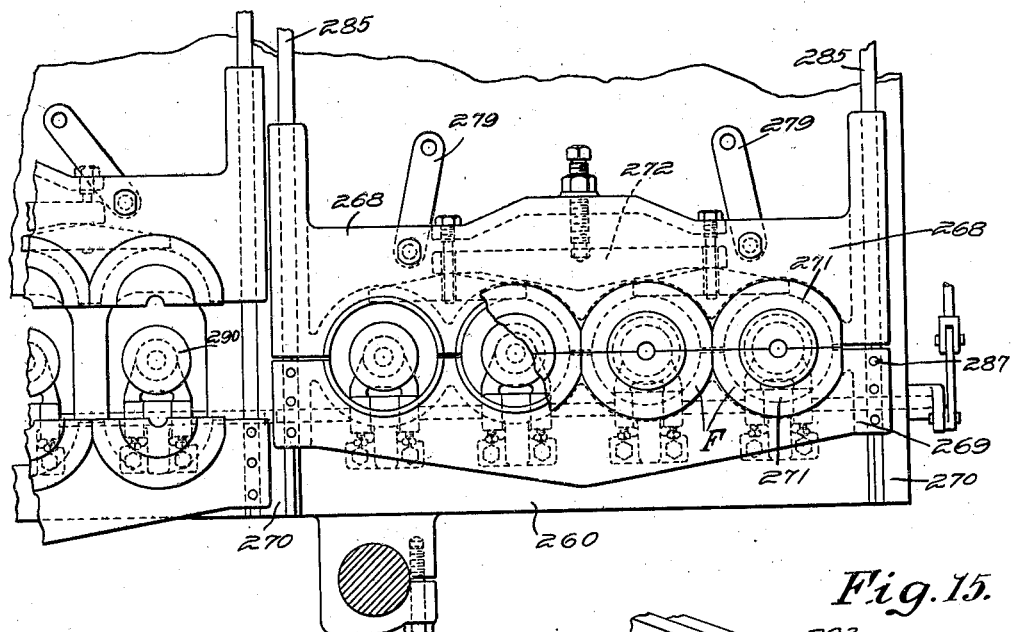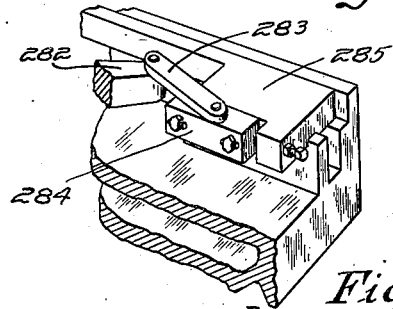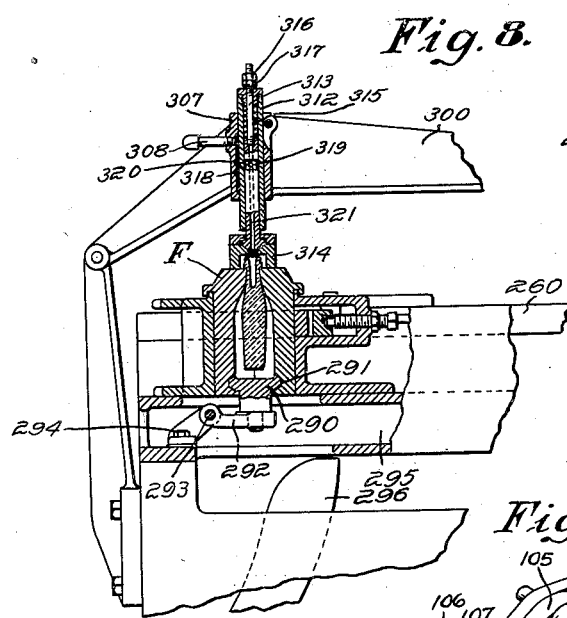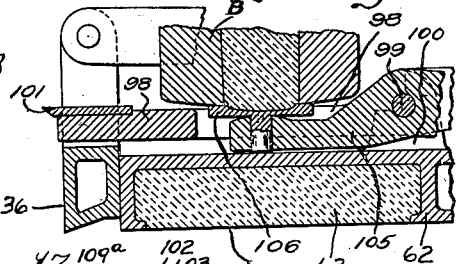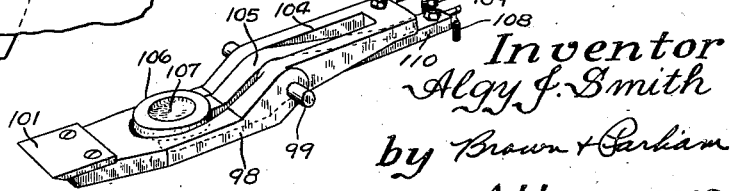

Jan. 1, 1935.  A. J. SMITH  1,986,765
APPARATUS FOR FABRICATING GLASSWARE
Filed Sept. 4, 1930   7 Sheets-Sheet 7

Inventor
Algy J. Smith
by Brown + Parham
Attorneys.

Witness:
A. A. Horn

Patented Jan. 1, 1935

1,986,765

UNITED STATES PATENT OFFICE 1,986,765

APPARATUS FOR FABRICATING GLASSWARE

Algy J. Smith, Bloomfield, Conn., assignor to Hartford-Empire Company, Hartford, Conn., a corporation of Delaware Application September 4, 1930, Serial No. 479,676

14 Claims. (Cl. 49—5)

This invention relates to apparatus for forming glassware, of the character in which glass parisons are formed in suction gathering receptacles or molds, which are dipped into contact with a pool of glass and are evacuated to gather charges of glass by suction, and the parisons formed therefrom are blown to final shape in finishing molds.

The invention has particular relation to apparatus for forming glassware utilizing the suction gathering method by the employment of a forming machine of what may be termed the stationary or non-rotary type, and preferably provided with a plurality of parison forming molds and a plurality of finishing molds to permit a number of parisons simultaneously to be formed, and simultaneously to be blown into finished articles of glassware. Such apparatus is disclosed in the patent of Karl E. Peiler No. 1,914,155, granted June 13, 1933, certain features of the apparatus therein disclosed forming part of the present invention and being claimed herein, and certain features of the apparatus illustrated and described herein being the invention of Karl E. Peiler and claimed in his aforesaid patent.

Heretofore, the usual practice in the art of forming glassware by the suction method has involved the use of a continuous one-table machine, as for example, the well-known Owens machine, although a continuous two-table machine for forming glassware by the suction method has been proposed.

The rotary type of machine has certain advantages over the non-rotary and stationary type in the manufacture of large quantities of glassware of a given size and/or shape. However, the rotary type of machine is not so well adapted to the needs of a manufacturer engaged in the production on a somewhat smaller scale, of glassware of varying sizes and/or shapes. For his purposes, the non-rotary or stationary type of machine has the advantages of low initial cost and low cost of maintenance over the rotary type of machine, and the further advantage of a more efficient operation for filling smaller orders of more widely varying sizes and/or shapes of glassware.

The general object of the present invention is to provide novel apparatus for producing glassware by the employment of which the use of the non-rotary type of glassware forming machine is made more efficient and more economical, with regard to both the quality and the quantity of glassware produced.

A further object of the invention is to provide novel apparatus for forming glassware, wherein a plurality of charges of glass for parisons are simultaneously gathered by suction, simultaneously formed into parisons, and the parisons simultaneously blown to final shape, and also in which the parison forming and finish blowing operations preferably overlap, resulting in an increased production of glassware.

Another object of the invention is to provide novel apparatus for forming glassware which involves the use of a plurality of finishing mold units each comprising one or more molds, with a single parison forming unit which also may comprise a plurality of molds, and which supplies parisons alternately to the finishing mold units. Thus, one or more parisons may be blown to final shape in one of the finishing mold units, while one or more parisons is being formed and introduced into the other finishing mold unit, greater use thereby being made of the parison forming unit, and hence greater efficiency and speed of operation being obtained, than in similar methods and machines heretofore proposed.

A further object of the invention is to provide novel apparatus for conditioning and reconditioning the glass in a gathering pool from which charges are removed for parisons, whereby the production of glassware of superior quality is afforded.

It also is an object of the invention to provide novel apparatus for enclosing the gathering pool from which charges are gathered, for severing the tails of glass from the gathered charges, for removing the tails of glass which drop back into the gathering zone of the pool, and for permitting the application of preliminary blowing air to the parisons. For the attainment of this object, a cover for the gathering pool may be provided upon which a scraper for removing the chilled glass from the gathering zone, a shear, and a bottom plate all may be mounted for joint and simultaneous operation by and with the cover.

Other objects of the invention include the provision of novel means for cooling the parison mold unit, for actuating the parison body molds and the parison neck molds of said unit, a novel arrangement of finishing molds, and novel operating means therefor, and means of novel construction for removing finished glassware from the finishing molds.

Still other objects of the invention will be pointed out in the detailed description thereof which follows, or will become apparent from such description.

In the drawings.

Fig. 3 is a view in horizontal sectional top plan taken on the line 3—3 of Fig. 1;

Fig. 4 is a view similar to Fig. 3 taken on the line 4—4 of Fig. 1;

Fig. 7 is an enlarged view in top plan of a fragmentary portion of the finishing mold units shown more completely in Fig. 3;

Fig. 8 is an enlarged view partly in side elevation and partly in vertical section of a fragmentary portion of the construction shown in Fig. 1, illustrating the engagement of a blow head with a finishing mold;

Fig. 12 is a view in horizontal sectional top plan taken on the line 12—12 of Fig. 1, and showing mechanism for opening the neck molds when they are at the transfer station;

Fig. 13 is a detail view in side elevation of cams for controlling the movement of the neck mold toward and away from the transfer station;

Fig. 14 is an enlarged detail view in vertical transverse section taken substantially on the line 14—14 of Fig. 3;

Fig. 15 is an enlarged view in perspective of a fragmentary portion of the finishing mold operating mechanism;

Fig. 16 is an enlarged view in longitudinal vertical section showing the engagement of a parison body mold with a bottom plate on the cover for the gathering pool; and Fig. 17 is a view in perspective on enlarged scale of one of the shear members and a bottom plate associated therewith.

Figure 1:
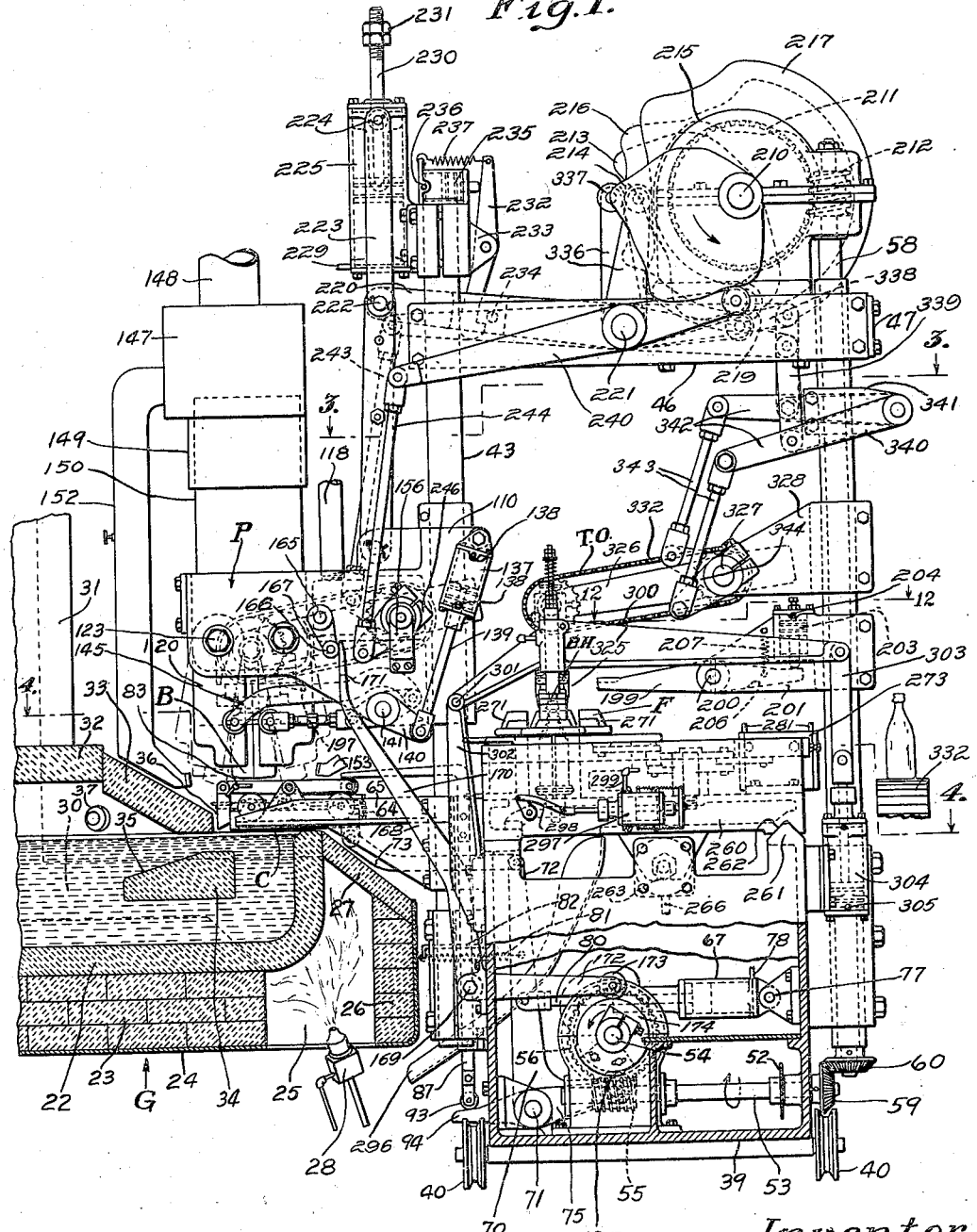
Figure 1 is a view principally in side elevation and partly in vertical longitudinal section of apparatus embodying the invention.

In general, the apparatus embodying the invention, comprises a container or extension G for a gathering pool from which charges of glass for parisons are removed by the parison forming unit indicated at P. Said unit may comprise a plurality of aligned parison body molds B (Fig. 2), a plurality of neck molds N, and a suction and blow head structure H. The body molds may be mounted in a vertically reciprocable frame and the head structure, which may carry the neck molds, may be mounted in an arbor, trunnioned in the frame and adapted to hold the neck molds in engagement with the body molds for vertical movements therewith, and to be oscillated to swing the neck molds toward and away from a parison transfer station.

The apparatus also preferably includes finishing molds F arranged in two groups on a movable carriage, Fig. 3, preferably slidably mounted for movement transversely of the machine, so that each group of molds may alternately be moved between the transfer station and its blowing station. Blow heads B. H., likewise arranged in two groups or units, are located at the respective blowing stations at each side of the machine for cooperation with the respective finishing mold units F.

Takeout mechanism T. O. is provided for removing finished ware from the finishing molds F. Each group of finishing molds may include the same number of finishing molds as there are parison forming molds in the parison forming unit. Likewise, the takeout mechanism T. O. may include the same number of takeout tongs as there are finishing molds in one of the finishing mold groups or units.

The apparatus also may include the cover plate indicated at C upon which a glass circulator, shears, and bottom plates may all be mounted.

A timer T may be provided for synchronizing the operation of various parts of the machine.

Briefly considered, the operation of the apparatus, as a whole, may involve the uncovering of the gathering pool, and the dipping of the parison forming unit therein to gather a plurality of charges for parisons, the raising of the parison forming unit, the enclosure of the pool, circulation of the glass, severing of the tails from the gathered charges of glass, and positioning of bottom closures in alignment with the parison molds to permit the preliminary blowing of the charges which form the parisons, the lowering of the parison molds into engagement with the bottom plates for the preliminary blowing of the charges into parisons, the transfer of the parisons to one of the sets of finishing molds on the transversely movable finishing mold carriage, the simultaneous blowing of the parisons to final shape in the finishing molds, and the simultaneous removal of finished articles from the finishing molds. The parison forming unit may operate through two cycles of operation for each cycle of operation of one of the finishing mold units by delivering one or more parisons alternately to said finishing mold units. In like manner, the takeout mechanism also may operate through two cycles for each cycle of operation of a finishing mold unit, being operable to remove finished ware alternately from said finishing mold units.

The construction of the apparatus of the invention now will be described in detail with reference to the drawings, the extension or container for the gathering pool being first described, followed by an explanation of the construction and operation of the forming machine proper.

The gathering pool container G

Figures 6, 6A:
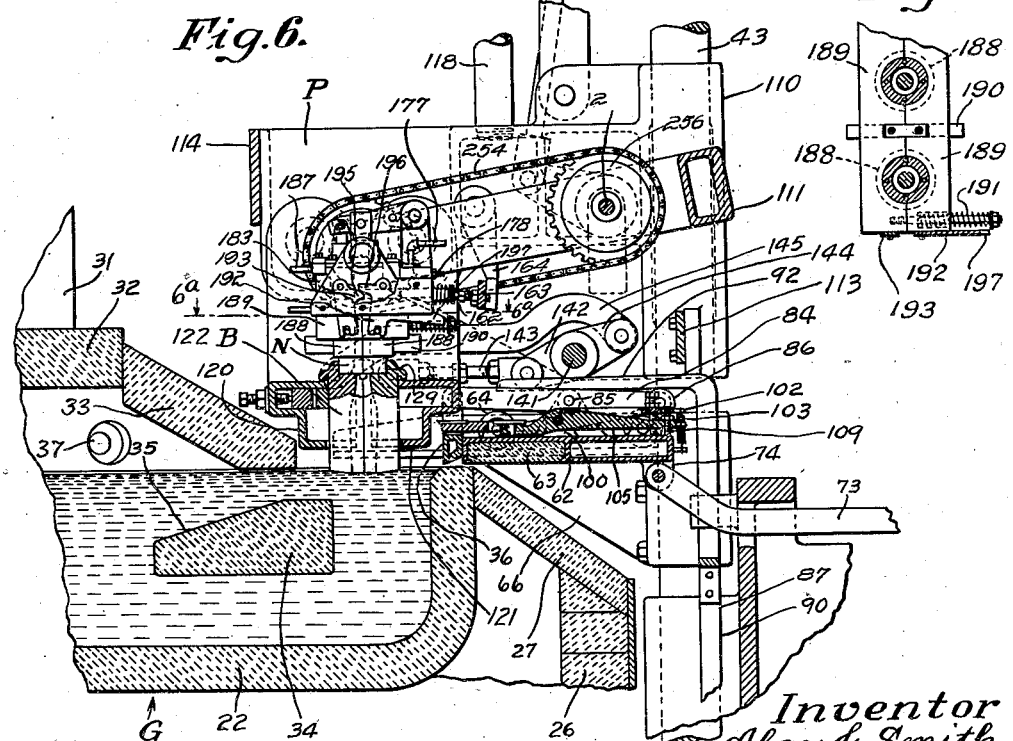
Fig. 6 is a view in longitudinal vertical section on an enlarged scale of the construction shown in Figs. 1 and 5, showing a parison mold dipping into the gathering pool, and also showing the gathering pool cover in retracted or open position.
Fig. 6a is a view in horizontal section of a fragmentary portion of the construction shown in Fig. 6 and taken on the line 6a—6a of said Fig. 6.

As shown in Figs. 1, 4 and 6, the container G for the gathering pool constitutes a generally rectangular extension 20 of a glass melting tank, a fragmentary portion of said tank being indicated at 21, Fig. 4. Said extension comprises an inner refractory lining 22 which rests upon insulating bricks 23 encased by sheet metal 24. The insulating bricks 23 terminate short of the front portion of the lining 22 as shown in Fig. 1, to provide the inner wall of a heating space 25, the outer or front wall of which is formed by a course of insulating bricks 26, also encased by sheet metal, and supporting an inclined refractory member 27 extending upwardly to the forward edge portion of the lining 22, and closing the top of the heating space 25.

The heating space 25 is so arranged as to permit heat from a burner 28 to be applied directly to the forward bottom and front portions of the lining 22 for the gathering pool, as a result of which the glass in the pool is heated from the bottom to near the top of the front portion thereof. The sides of the pool of glass also are heated by the products of combustion from the burner 28 by means of flues 30 which lead from the ends of the heating or combustion space 25 along the sides of the lining 22 to a point where they are connected to vertical stacks 31 disposed at the sides of the extension 20, as shown in Fig. 4.

The stacks 31 are arranged at the ends of a horizontal refractory cover 32 which encloses the innermost portion of the gathering pool, the adjoining forward portion of the pool being partially enclosed by the downwardly extending refractory member or cover 33 which terminates short of the forward portion of the lining 22 to provide an exposed elongate gathering area from which charges of glass are removed by the parison unit P. This exposed portion of the gathering pool is closed during the intervals between gathering operations by the cover C, the construction and operation of which will be described hereinafter.

Extending transversely of the container or extension is a submerged baffle 34 having an inwardly and downwardly inclined surface 35, as shown in Figs. 1 and 6. The baffle 34 is so positioned as to permit glass to flow outwardly beneath the same toward the front of the pool, upwardly to the gathering zone, and rearwardly over the baffle to the innermost portion of the gathering pool. Such flow of the glass is assisted by the heating thereof by burner 28 which causes hot glass at the bottom of the front portion of the pool to rise upwardly into the gathering zone, and by a scraper and circulator 36 which extends nearly the full length of the cover opening, and is carried by the cover C and dipped into the glass as the cover closes, to impel chilled glass produced by the gathering operation, toward the rear of the gathering pool. The construction of the scraper and operating means therefor will be described later.

If desired, the glass in the gathering pool may be heated rearwardly of the baffle 34 by means of suitable burners, one of which is shown at 37, Fig. 1. Such burners are arranged to discharge hot products of combustion through suitable ports into contact with the glass in the pool, and may assist in the reconditioning of the chilled portions of glass impelled inwardly of the pool by scraper or circulator 36.

*General construction of the machine and driving mechanism*

Figure 2:
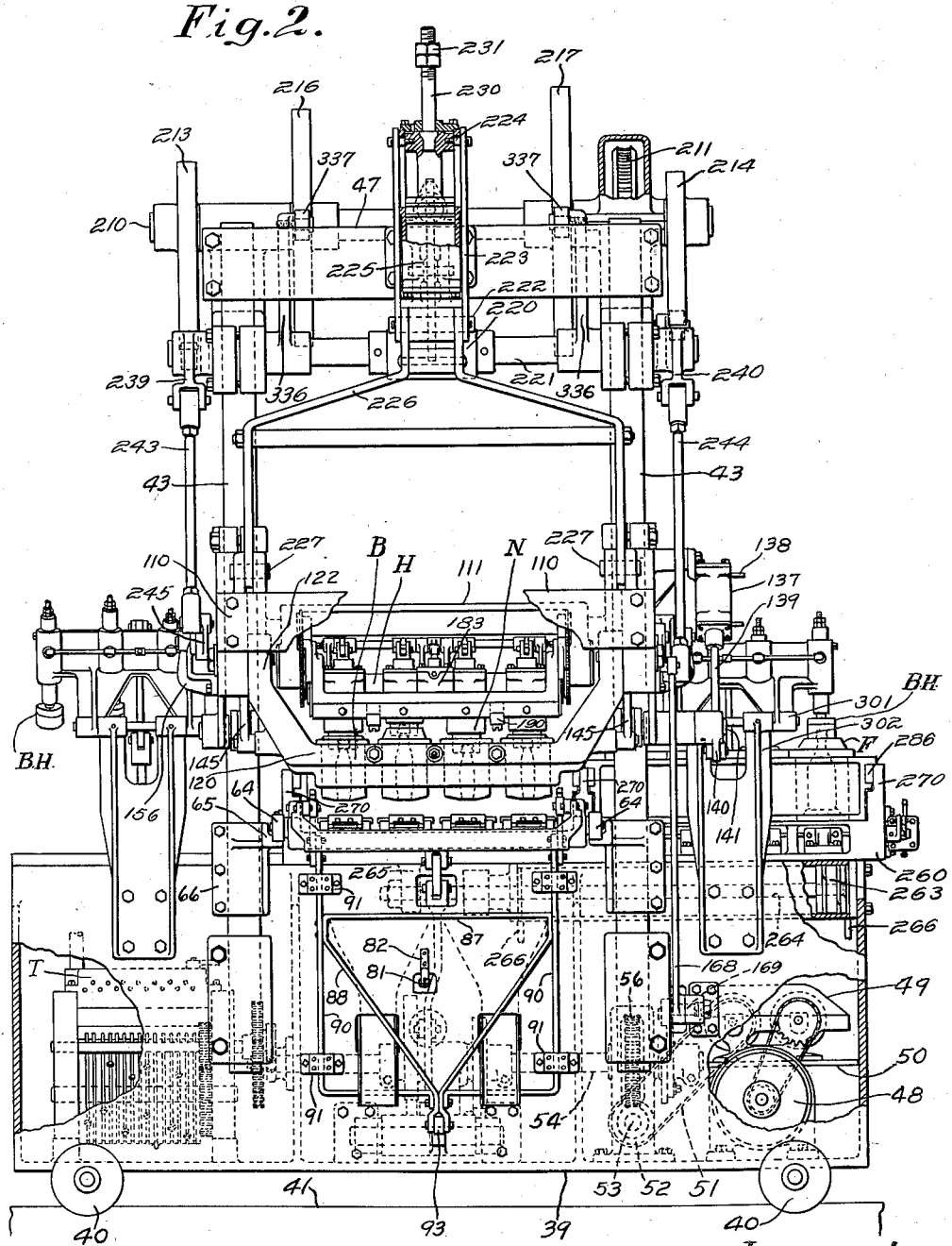
Fig. 2 is a view in rear elevation of the machine proper of the apparatus shown in Fig. 1, taken from directly in front of the gathering pool which is omitted, and parts being broken away to show portions of the machine otherwise concealed.

As shown in Figs. 1 to 4, inclusive, the forming machine proper comprises a transversely extending box-like casting or body 39 carrying wheels 40 by which the machine is mounted on tracks as indicated at 41, Fig. 2, for travel transversely of the gathering pool. Secured to the rear side wall of the hollow body of the machine are a pair of posts 43, and similar posts or columns 44 and 45, the latter of which is tubular, are secured to the front side wall of the hollow body or base. The upper ends of the columns have secured thereto horizontal longitudinally extending frame members 46, and similar transverse members 47, said members being secured together to form a closed framework of rectangular shape.

Mounted in one corner of the hollow body 39 is an electric motor 48, Figs. 2 and 4, which drives a Reeves variable speed drive indicated at 49, mounted on the platform 50, through a chain and sprocket, as shown. The Reeves variable speed drive is of known construction and need not be described in detail. Suffice to say that it drives a chain 51, Figs. 2 and 4, engaging a sprocket wheel 52 on a shaft 53, Fig. 4, extending transversely of the hollow body of the machine, and suitably mounted in bearings provided therein. The shaft 53 drives a shaft 54 extending longitudinally of the hollow body 39, by means of a worm 55 on shaft 53, Figs. 1 and 2, in mesh with a worm gear 56 on the shaft 54. Shaft 54 carries cams for operating various parts of the mechanism as hereinafter described, and also serves to drive timer T, Fig. 4, through suitable reduction gearing, indicated at 57, which serves to rotate the timer at one-half the speed of rotation of shaft 54.

The timer mechanism T may control the flow of fluid pressure to and from various air cylinders for operating certain parts of the parison and finishing mold units. The timer mechanism may be of any suitable construction, preferably of the type shown in British Patent No. 257,637, of September 2, 1927, which is substantially the same as the timer used on the Hartford-Empire individual section machine, which has been in use for some time. The drum of the timer has slots formed therein in which valve-operating buttons are mounted, there being twice as many bottoms for the parison forming unit as for the finishing mold units, because as previously stated, the former operates through two cycles for each cycle of a finishing mold unit.

Shaft 53 also serves to drive a vertical shaft 58, Fig. 1, extending upwardly through hollow column 45, previously referred to, the outer end of shaft 53 carrying a bevel gear 59 in mesh with a similar bevel gear 60 on the bottom of the shaft 58. The purpose of the shaft 58 will be explained hereinafter.

*The cover C and associated mechanisms*

The construction of the cover C and the parts carried thereby, now will be described.

Said cover comprises a rectangular flat casting 62 (Figs. 6 and 16), preferably of hollow construction, and interiorly separated into two compartments, the rear compartment containing refractory material, as indicated at 63. The casting or plate 62 carries rollers 64 at its corners, Figs. 1, 2, 4 and 6, which rollers ride upon tracks 65, Figs. 2 and 4, provided on horizontal rearwardly extending arms 66 suitably secured to the lower portions of the posts or columns 43. Thus, the cover C is mounted for reciprocation in a horizontal plane into and out of a position to enclose the exposed portion of the gathering pool.

Mechanism is provided for reciprocating the cover which comprises an air spring 67, Fig. 1, which quickly moves the cover into closed position, and a cam 68 on shaft 54, Fig. 4, for returning the cover to open position compressing the air in the spring 67. Said air spring and cam operate a bell crank lever 70 pivoted on transverse shaft 71 mounted on the bottom of the hollow body 39 of the machine. The upper end of the vertical arm 72 of said lever is connected to one end of a link 73, Figs. 1 and 6, the other end of which is pivotally connected to a lug 74 on the outer edge of the cover. The generally horizontal arm 75 of bell crank lever 70 carries a roller 76, Fig. 4, which rides on cam 68, so that said cam may operate to move the cover to open position.

Air spring 67 is pivoted at its outer end at 77 to a bracket secured to the inner side of the outer side wall of the body 39 of the machine, Fig. 1. Said air spring is provided with a conduit 78 connected through means, not shown, directly to the source of air supply for the machine. The piston rod 80 of the air spring is connected to the vertical arm 72 of bell crank lever 70, as shown in Fig. 1. A tension spring 81, Figs. 1 and 2, connected at its one end to the arm 72 of the bell crank lever, and at its other end to a bracket 82 secured to the outside of the inner side wall of the body of the machine, yieldingly urges the cover to closed position, thereby assisting the action of air spring 67.

As previously stated, scraper 36 is mounted, or may be mounted, upon the cover C for movement therewith. As shown in Fig. 6, scraper 36 is of hollow construction which permits a cooling medium to be circulated therethrough, suitable conduits, one of which is indicated at 83, Fig. 1, being connected to the scraper for that purpose.

The scraper 36, is supported for vertical movement in sliding engagement with the rear edge of the cover plate member 62, by means of levers 84, Figs. 4 and 6, connected at their inner ends to the outer ends of the scraper, and pivoted at 85 intermediate their ends to the ends of the cover plate 62. Levers 84 carry rollers 86 at their outer ends which are engaged by means for rocking the levers and thereby reciprocating the scraper. Said means comprises a frame member of general rectangular shape as indicated at 87, Figs. 2 and 6, having a triangular reinforcing member 88 inserted therein. The frame member 87 is mounted by its side members 90 for vertical movement in guides 91 secured to the outer side of the inner side wall of the body 39 of the machine. The side members 90 of the frame 87 extend upwardly through the upper guides 91 to a point where they are bent at right angles to provide elongated rearwardly extending horizontal arms 92 which pass over and engage rollers 86 on levers 84. See Figs. 1, 2, 4 and 6. Said arms are of sufficient length to permit constant engagement thereof with rollers 86, irrespective of the position of the cover C.

Frame member 87 is reciprocated in timed relation to the reciprocation of the cover to effect the desired operation of the scraper. To this end, a roller 93, Figs. 1 and 2, secured to downwardly extending portions of the frame 87, as is more clearly shown in Fig. 2, engages one end of a lever 94 pivoted on the shaft 71, previously referred to, and carrying a cam roller 95 on its other end engaging a cam 96 on shaft 54, Fig. 4. The contour of cam 96 may be such, that it operates through the connections above described, to raise arms 92 after cover 62 has been moved inwardly a short distance, thereby permitting the scraper 36 to drop into contact with the glass and impel such chilled glass as may be present inwardly of the gathering pool, the scraper being elevated as the cover reaches the end of its inward travel by the lowering of arms 92.

In this manner, cam 96 and the mechanism interposed between the cam and the scraper serves in conjunction with the reciprocation of the cover to effect the desired operation of the scraper.

The construction of the shears and bottom plates now will be described with particular reference to Figs. 4, 6, 16 and 17. Since the shears and bottom plates are identical in construction, the description of one of each of them will suffice for all.

Each of the shear members comprises a mounting or support 98 having a pin 99 passing therethrough intermediate its ends to provide trunnions by means of which the shear member is pivotally mounted in lugs 100 formed on the top of the cover plate member 62, Figs. 4, 16 and 17. Removably secured to the inner end of the shear mounting 98 is a shear blade 101, the cutting edge of which preferably extends at an acute angle to a line at right angles to the mounting or support 98.

Secured to the other end of the mounting 98 is a pin 102 to which the upper end of a tension spring 103 is connected, the lower end of which is connected to the outer edge of the cover plate member 62 to yieldingly hold the shear blade in a slightly upwardly inclined position for yielding engagement with the appropriate parison mold.

The shear mounting 98 is cut away as indicated at 104 to receive the supporting arm 105 for the bottom plate or closure 106. This bottom plate may be slightly recessed as indicated at 107 as desired, to shape the bottom of a charge of glass during the preliminary blowing thereof into a parison. The bottom plate support 105 is pivotally mounted upon the central portion of the pin 99 previously referred to, and extends outwardly with respect to the cover beneath the adjoining end of the shear blade mounting 98, a sufficient distance to provide for the connection of the tension spring 108 to a pin on the end thereof, said tension spring also being connected to the outer edge of the cover plate member, and serving yieldingly to hold the bottom plate in engagement with the parison mold (Fig. 16). An adjusting screw 109 may be provided in the arm 105, as shown in Figs. 6 and 17, for regulating the upward movement of the bottom plate by the tension spring 108, and a similar screw 109a may be provided in shear blade mounting 98 for a similar purpose.

As will be understood, the movement of the cover into closed position by the mechanism previously described, serves to project the shear blades across the bottoms of the parison molds to sever the tails of glass from the charges in the molds and simultaneously to position the bottom plates 107 in vertical alignment with the parison molds for subsequent engagement therewith.

The parison forming unit

The parison forming unit comprising the parison body molds B and cooling means therefor, the head structure H, and neck molds N, now will be described, having particular reference to Figs. 1, 2, 3, 5 and 6.

*a. The parison body molds and cooling means therefor*

The parison body molds B are permanently associated with a vertically movable ram or carriage 110 slidably mounted on the vertical posts or columns 43. The suction and blow head structure H, and the associated neck molds N are carried by an arbor 111 mounted on trunnions in the carriage 110 and adapted to hold the blow head, neck molds, and body molds in assembled relation for vertical movements at the gathering station to swing the head H and neck molds with parisons suspended therefrom from above the gathering pool through vertical planes into a position in which the finishing molds may close about the parisons at a transfer station, and to return the head and neck molds to a position above the gathering pool for subsequent engagement with the parison molds.

The mechanism for reciprocating the carriage 110 and for oscillating arbor 111 is described hereinafter.

Figure 5:
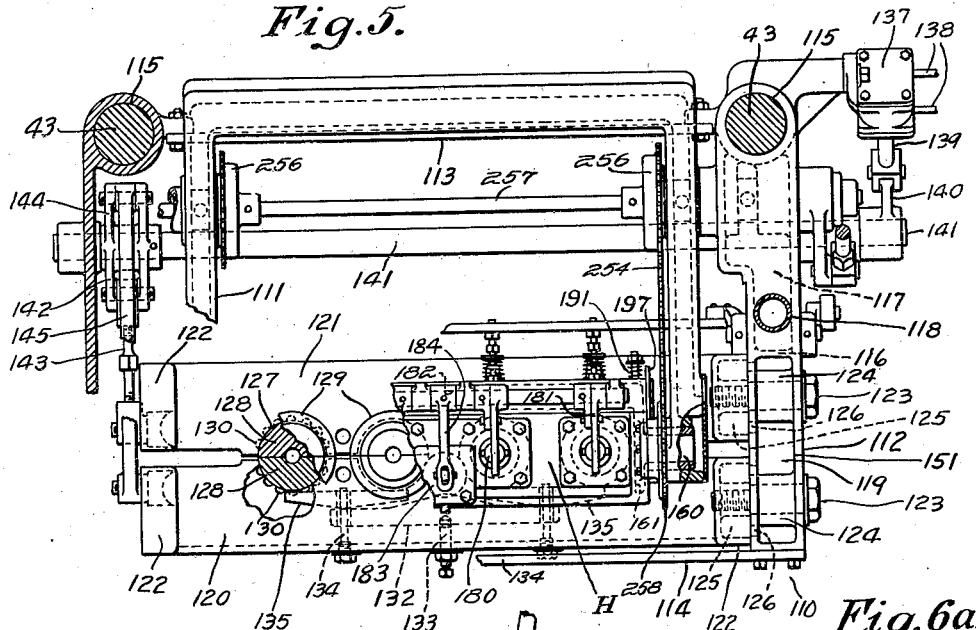
Fig. 5 is an enlarged view in top plan of the parison forming unit and associated supporting and operating mechanism, parts being removed and broken away for clearness of illustration.

The carriage 110 comprises hollow side members 112, Figs. 3, 4 and 5, held in spaced relation by transverse stretchers 113 and 114 connected respectively to the outer and inner ends of the side members. The outer ends of the side members 112 of the carriage have suitable openings 115 formed therein by means of which the ram or carriage is slidably mounted upon the posts or columns 43.

Each of the side members 112 is divided interiorly by a partition 116 (Fig. 5) to provide a vacuum compartment 117 to which vacuum is applied through a suitable conduit 118, and a wind compartment 119 to which cooling wind or air is supplied as hereinafter explained. The conduit 118 may suitably be connected to timer T.

Extending between the innermost end portions of the side members 112 are the parison body mold holders 120 and 121, Figs. 1, 2, 3, 5 and 6, the upwardly extending end portions 122 of which receive the threaded end portions of trunnion-bolts 123 extending through bushings 124 (Fig. 5) formed preferably integrally in the side members 122.

Said upwardly extending end portions 122 of the body mold holders have passageways 125 formed therein which register with ports 126 in the side members 112 to permit cooling wind to pass from the chamber 119 into the hollow mold holders 120 and 121.

The holders 120 and 121 have opposed generally semi-circular recesses 127 formed therein in which the sections 128 of the body parison molds are mounted, said sections being held in position by flanges 129 formed on the upper ends thereof, as shown in Figs. 5 and 6. The molds may be of varying size and/or shape, as illustrated in Fig. 2, to permit the fabrication of articles of corresponding sizes and/or shapes. They are preferably so mounted, however, that their bottoms are in the same horizontal plane in order to dip them simultaneously into the gathering pool.

The recesses 127, in which the mold sections are mounted, are serrated as indicated at 130 to permit cooling air supplied to the interior of the holders, to escape from the holders along the sides of the molds.

As shown in Figs. 5 and 6, means is provided whereby the prevention of one or more molds from closing, as by a piece of glass being wedged between the mating sections thereof, will not prevent the remaining molds from closing. Said means comprises what may be termed a swingletree equalizing mechanism which is associated with holder 120. It comprises a doubletree 132 loosely mounted at its center upon an adjustable pivot 133 and guided by studs 134 passing loosely through the ends thereof as shown in Fig. 5. Loosely mounted upon the studs 134 are swingletrees 135 engaged at their centers by the ends of the doubletree 132, the ends of these swingletrees bearing against the mold sections 128 carried in holder 120, as shown. By means of this construction, the failure of any one or more of the parison body molds to close, will not prevent the remaining molds from closing.

The parison body molds B are opened and closed by swinging movements of the mold holders 120 and 121 away from and toward each other. Such swinging movements are imparted to the mold holders by means of an air motor 137 pivotally mounted upon one of the side members 112 of carriage 110, as shown in Figs. 1, 2, 3 and 5. The air motor 137 has conduits 138 connected thereto which lead from the timer T for the supply and exhaust of air pressure to and from the opposite ends of the air motor.

The piston rod 139 of the air motor is connected to a crank arm 140 on horizontal transverse crank shaft 141 suitably journaled in the side members 112 of the ram or carriage 110. Crank shaft 141 has a pair of crank arms 142 mounted thereon near its ends and connected by adjustable links, one of which is shown at 143, Figs. 5 and 6, to the mold holder 121 near the ends thereof. Said crank shaft also carries crank arms 144 connected respectively by curved links 145 to the mold holder 120, Figs. 1, 2, 5 and 6. By means of this construction, reciprocation of air motor 137 will cause the mold holders 120 to be swung away from each other into open position as indicated in broken lines in Fig. 1 to open the body molds, and to be swung toward each other to closed position, as shown in full lines in said Fig. 1.

Cooling wind is supplied to the parison mold unit from a wind box 147 (Fig. 1) to which wind is conducted by an inlet pipe 148. Wind box 147 extends transversely of the machine and has downwardly extending rectangular shaped conduits 149 at the ends thereof which slidably receive similarly shaped conduits 150 which are singly mounted in rectangularly shaped openings 151 (Fig. 5) provided in air chambers 119 in the side members 112 of the ram or carriage 110. Thus, cooling wind may constantly be supplied to the mold holders from the stationary wind box 147, and through the wind chambers 119 previously referred to, irrespective of the vertical position of the ram or carriage.

The wind box 147 also may have downwardly and outwardly extending wind nozzles 152 connected thereto for causing cooling wind to play upon the bottom portions of the parison body molds from the rear of said molds. As shown in Fig. 4, four of such nozzles may be provided for applying separate streams of cooling air to the individual molds and adjacent instrumentalities. Similar nozzles likewise may be connected to wind box 147 and arranged to discharge cooling air upon the parison molds and associated mechanism from in front of said molds, one of said nozzles being partially shown at 153 in Fig. 1.

b. The suction and blow head structure H

Considering now the construction of the suction and blow head structure H, and referring to Figs. 1, 2, 4, 5, 6, 12, 13 and 14, it will be seen that the arbor 111 has connected thereto hollow trunnions or bushings, one of which is shown at 154, Fig. 14. Each of said trunnions extends through a side member 112 of the carriage 110, and engages a boss 155 on bracket 156 secured to the outer side of the carriage 110. Ports 157 and 158, respectively, provide communication between a vacuum chamber 117 in carriage 110, and the interior of bushing 154, and between the interior of said bushing with the interior of the hollow arbor 111. Hence, vacuum is applied through the vacuum chambers 117 to the interior of said arbor.

As indicated in Fig. 5, the suction and blow head H is swingably mounted in the ends of the side arms of arbor 111 by hollow trunnions 160. Said hollow trunnions 160 provide communication between the hollow arms of the arbor and a vacuum passageway 161 formed in the head H. The passageway 161 in effect constitutes a manifold through which vacuum is supplied to passageways (not shown) leading to suction compartments (not shown) individual to the several neck molds and parison body molds. The application of vacuum through such passageways may be controlled by valves, the stems of which are indicated at 162, Figs. 3 and 6.

The interior construction of the head H is not shown nor described in detail, being substantially the same as that shown in my Patent No. 1,901,934, granted March 21, 1933. Suffice to say that the vacuum valves are jointly operated by the engagement with the stems of the valves of the heads of bolts adjustably mounted on a transverse bar 163, Figs. 3 and 6. Said bar is carried and oscillated by crank arms 164 connected to short crank shafts 165 suitably journaled in the side members 112 of the ram or carriage 110. The bar 163 is oscillated to open or close the vacuum valves by mechanism adapted to cooperate with roller 166 on a crank arm 167 connected to one of the crank shafts 165, see Figs. 1 and 3.

Said mechanism comprises a bell crank lever 168, Figs. 1 and 2, pivoted at 169 in a bracket secured to the outer side of the inner side wall of the hollow body 39 of the machine. The arm 170 of the bell crank lever 168 is inclined upwardly and rearwardly to a point where it is bent to provide a substantially vertical portion 171 of sufficient length to permit constant engagement of the arm with roller 166 irrespective of the vertical position of the ram or carriage 110. The other horizontal arm 172 of the bell crank lever 168 extends inwardly of the hollow body 39 of the machine and carries a cam roller 173 on the end thereof engaging a cam 174. Cam 174 preferably is provided with an adjustable cam lobe 175, and is adjustably secured to transverse shaft 54, previously referred to. Rotation of cam 174 rocks lever 168 which in turn rocks bar 163 to open or close the vacuum valves.

By adjusting the cam lobe 175, and by adjusting the cam as a whole relative to shaft 54, the time of application of vacuum to the parison molds and the period in which vacuum is applied, may be regulated as desired.

Preliminary blowing air may be supplied to the vacuum and blow head structure through a conduit 177, Fig. 6, leading from the timer T. As is the case in the construction shown in my patent above referred to, needle valves, one of which is indicated at 178, Fig. 6, may be provided for controlling the pressure of preliminary blowing air supplied by the timer T.

Suitable neck pins or plungers are provided in the vacuum and blow head structure H, such for example, as is illustrated in my previously mentioned patent, the upper ends of the plungers being indicated at 180, Figs. 3 and 5. Said plungers are connected for joint operation by crank arms 181 loosely mounted on but connected to crank shaft 182 which is rocked at appropriate times to depress or retract the plungers by an air motor 183 connected by crank arm 184 to crank shaft 182, see Figs. 3 and 6.

Connection between crank arms 181 and crank shaft 182 may be afforded by crank arm members 185 rigidly secured to the crank shaft and connected by pins 186 to the crank arms 181. Crank arms 181 being loosely mounted on crank shaft 182, any one of the neck pins or plungers may be put out of operation by disconnecting the appropriate crank arm 181 from the associated crank arm 185.

Air motor 183 has conduits connected thereto as indicated at 187, which may lead from the timer T, for controlling the operation of the air motor and hence of the neck pins or plungers.

c. The neck molds N

The construction of the neck molds may best be understood by reference to Fig. 6 wherein the molds are shown as comprising divided sections 188 carried by holders 189 slidably mounted upon cross pieces, one of which is shown at 190, Figs. 2 and 6. Said cross pieces are rigidly secured to the under side of the head H by means of bolts, as shown in Fig. 2. The neck molds yieldingly are held closed by means of springs, one of which is shown at 191, Fig. 6a, and said molds are held closed by the body molds, as illustrated in said Fig. 6.

In order to open the neck molds by sliding apart the holders 189, a pair each of levers 192 and 193 are provided, Fig. 6, the levers of each pair being pivoted at their upper ends to the outer ends of head structure H, and having pin and slot connections with the holders 189. Lever 193 has a lug 195 thereon extending beneath and engaged by a similar lug 196 on lever 192. Lever 192 is provided with an arm 197, Figs. 3, 5 and 6, by means of which said lever may be rocked about its pivot to spread the neck mold holders and neck molds apart.

The arms 197 of levers 192 extend toward the front of the machine as shown in top plan in Figs. 3 and 5.

The only time that the neck molds need be opened is when they are moved to the transfer station. Consequently, mechanism provided for engaging the arm 197 to open the neck molds, is located near the transfer station. As shown in Figs. 1 and 12, said mechanism comprises a pair of crank arms or fingers 199 mounted in transversely spaced relation upon a crank shaft 200 suitably journaled near its ends in brackets 201 secured to the posts 44 and 45 of the machine.

The inner ends of the crank arms or fingers 199 have slots 202 formed therein adapted to receive the outer ends of the arms 197, when the neck molds are moved to the transfer station. Subsequent oscillation of crank shaft 200 serves to open the neck molds and such oscillation is effected by means of an air motor 203, Figs. 1 and 12, carried by one of the brackets 201.

Air motor 203 has a conduit 204 connected thereto, which may lead from timer T, for supplying air to and exhausting the same from the air motor. The piston rod of the air motor bears upon a crank arm 206 on crank shaft 200, so that admission of air to the motor depresses the crank arm 206 and elevates crank arms or fingers 199 to open the neck molds. The fingers are held up until after the neck molds have moved away from the transfer so that they will clear the neck portions of the parisons prior to being closed by the springs 191. Upon release of air from motor 203, a tension spring 207 connected to crank arm 206, as shown in Fig. 1, elevates the latter, depressing crank arms 199 and positioning the fingers 199 for another neck mold opening operation.

d. The mechanism for reciprocating the ram and for oscillating the neck mold support We now come to consider the mechanism for reciprocating the carriage 110 of the parison forming unit, and for oscillating the arbor 111 between the suction gathering and transfer stations.

Referring particularly to Figs. 1, 2 and 13, it will be seen that a transverse cam shaft 210 is mounted in bearings carried by the side frame members 46 of the upper rectangular frame structure of the machine. Shaft 210 has mounted thereon a worm gear 211 with which a worm 212 on previously mentioned shaft 58, is in mesh. Thus, shaft 58 serves to rotate cam shaft 210 in counterclockwise direction, as indicated by the arrow, Figs. 1 and 13, and said shaft is rotated twice as fast as timer T.

Cam shaft 210 has cams 213 and 214 mounted on the ends thereof, Fig. 2, which oscillate arbor 111, through connections presently to be described. A cam 215 mounted on shaft 210 near its center serves to reciprocate the carriage 110 as hereinafter explained. Said cam shaft also carries cams 216 and 217 for operating the takeout mechanism, said cams being located respectively between cam 215 and the previously mentioned cams 213 and 214, see Fig. 2. The cam shaft is rotated at such a speed, and cams thereon are so shaped, as to effect the desired synchronism between the operations of carriage 110 carrying the parison body molds of arbor 111 carrying the neck molds, and of the takeout mechanism, with each other and with the finishing mold units F.

The carriage reciprocating cam 215 is engaged by a roller 219 (Fig. 1) carried on the outer end of a lever 220 fast upon a transverse shaft 221 suitably journaled in the side frame members 46.

At its inner end, lever 220 is connected by a pin 222 to the bottom ends of upwardly extending links 223 connected to the cross head 224 of air motor 225, and to the central top portion of a downwardly extending yoke 226, the bottom ends of the side portions of which are pivotally connected to the ram or carriage 110 as indicated at 227, Fig. 2.

It will be seen that cam 215 oscillates lever 220 to reciprocate carriage 110 at appropriate times. The action of lever 220 is assisted by air spring 225 to which air may be admitted and from which such air may be exhausted by a conduit 229 connected to the space in the bottom portion of the air motor. Said conduit 229 may suitably be connected directly to the source of air supply for the machine, and by the admission and exhaust of air through said conduit to and from the air spring, the weight of the carriage and parts supported thereby may be nicely balanced to permit easy operation of the carriage by cam 215 and lever 220. However, cam 215 is capable of reciprocating the carriage 110 without the assistance of air spring 225.

In order to permit the lowermost position of the carriage and parison molds mounted therein to be regulated, to suit the level of the molds to the level of the glass in the gathering pool, the air motor is provided with an upwardly extending rod 230 having nuts 231 threaded on its upper end. The engagement of one of the nuts with the upper head of the air motor determines the lowermost position of the parison molds.

The cam 215 is so shaped as to cause the carriage 110 and the parison unit to be lowered to dip the molds in the gathering pool; to be raised to an intermediate position so that the cover C may close and sever the tails from the charges in the molds; to be lowered to engage the bottoms of the body molds B with the bottom plates on the cover C; and finally to be raised to the uppermost position for the beginning of the transfer operation. It will be understood that head H and neck molds N partake in the foregoing vertical movements of the carriage 110.

Safety means preferably is associated with the carriage reciprocating mechanism whereby the carriage is held in its upper position upon failure of the air pressure supply for the machine. As shown in Fig. 1, said means comprises a hook shaped lever 232 pivoted intermediate its end on a bracket 233 and adapted to lock lever 220 in its elevated position by engaging a pin 234 on lever 220. Lever 232 is moved to inoperative position by the action of an air motor 235 to which is connected a conduit 236 leading directly from the air supply of the machine. The supply of air to the air motor 235 moves the lever 232 into inactive position, in which position it is shown in Fig. 1, and the exhaust of such air pressure from the air motor permits a tension spring 237 to rock the lever into locking position. Thus it will be seen, that when the air pressure fails, lever 231 is moved to locking position, and downward movement of carriage 110 and of the parison molds is positively prevented.

If the carriage is in a lowered position when the air pressure fails, cam 215 will rock lever 220, raising the carriage, to permit lever 232 to engage pin 234.

Motion is transmitted from cams 213 and 214 to the arbor 111 by means of levers 239 and 240 respectively, mounted for rocking movement upon the transverse shaft 221 previously referred to. Levers 239 and 240 carry rollers 241 and 242 engaging respectively the cams 213 and 214, see Fig. 13.

Levers 239 and 240 are connected at their inner ends to the upper ends of links 243 and 244, Figs. 1 and 2, the lower ends of which are connected to crank arms 245 and 246, Figs. 1, 2 and 5, which crank arms are clamped to the hollow trunnions 154 of the arbor 111. The connection of the crank arm 245 with one of the hollow trunnions 154 is clearly shown in Fig. 14.

Cams 213 and 214 are mounted in angularly spaced or staggered relation to each other on the shaft 210 as also are the crank arms 245 and 246 on their respective trunnions. This arrangement prevents interruption to the swinging movements of the arbor which otherwise would result when one of the links 243, 244 reaches a dead center position with respect to its crank arm. Thus, when one of said links has reached a dead center position, the other of said links will be ahead or beyond such position, serving to maintain the arbor in motion.

Cams 213 and 214 though similar in contour, are so shaped as to compensate for the differences in their action upon their respective levers due to their being mounted in angularly spaced relation on the shaft 210. Although the cams supplement one another in preventing dead center interruption to the movement of the arbor, the cam 213 is the most active in swinging the arbor from the transfer station to the gathering station, while the cam 214 is the most active in swinging the arbor from the gathering station to the transfer station.

However, in view of the similarity between cams 213 and 214, only one of them need be described in detail. Referring to Fig. 13, and bearing in mind that cam 214 is continuously rotated counterclockwise, it will be seen that the roller 242 engages the cam at a point indicated at 248. At this time, the arbor is in substantially the position in which it is shown in Fig. 1, having been raised from the parison blowing station by the elevation of the carriage 110 to its uppermost position, and the parison body molds having been opened to release previously formed parisons suspended from the neck molds, permitting the beginning of the transfer operation. As the cam 214 rotates, the roller rides along the edge of the cam to approximately the point indicated at 249, during which time the cam 214 acts in conjunction with cam 213, to swing the arbor carrying neck molds N and parisons suspended therefrom, to the transfer station.

There is a brief dwell of the arbor at the transfer station to permit the transfer of parisons to the finishing molds, such dwell taking place while the roller rides from the point 249 to approximately the point 250. This gives sufficient time for the finishing molds to be closed about the parisons and the neck molds to be opened, releasing the parisons in the finishing molds.

The return movement of the arbor begins when the roller leaves the point 250 on the cam 214 and such movement is completed approximately by the time that the roller reaches the point 251 on the cam 214. As a result of such movement, the neck molds may again engage the body molds, which in the meantime have been held in their uppermost position, and are now closed about the neck molds. At the point on cam 214 indicated approximately by the reference character 252, the roller 242 is disengaged from the cam to permit the arbor and the head H and neck molds N carried thereby to cooperate with the parison body molds by being lowered and raised therewith during the glass gathering and parison forming operations. The roller 242 remains out of engagement with the cam from the point 252 to approximately the point of beginning indicated at 248, the cam being cut away between those points.

It will be observed by reference to Figs. 1 and 6 that the arbor 111 occupies a downwardly inclined position with respect to a horizontal plane through the axis of its trunnions. The arbor occupies a similar position at the transfer station although not so illustrated in the drawings. Thus, during the oscillation of the arbor from the position shown in Fig. 1 to the transfer position, the arbor is moved through an angle greater than 180°, such angle of movement in the construction illustrated being approximately 204°.

During the oscillation of the arbor 111, the suction and blow head H, neck molds N, and parts carried by the head H are maintained in vertical position by means of chains 254, Figs. 3 and 5, which mesh with sprocket wheels 256 on a shaft 257 rigidly secured in the brackets 156, previously referred to, and with similar sprocket wheels 258 fastened on trunnions 160 of the head structure H. As the arbor 111 is oscillated, chains 254 rotate the head H relative to the arbor, to the same extent to which the arbor is rotated, but in an opposite direction, thereby maintaining the head H, the neck molds N, and parison suspended from the neck mold in vertical position.

The finishing molds F

Considering now the construction and arrangement of the finishing molds, it will be seen that the two sets thereof are mounted on a carriage 260, Figs. 1, 2, 3, 7 and 8, mounted for reciprocation transversely of the machine and longitudinally of the hollow body or casting 39 with the top of which the carriage has sliding engagement. As shown in Fig. 1, the hollow casting or body 39 is provided on its upper front edge with a wedge-shaped guide 261 which is received in a wedge-shaped opening 262 in the carriage 260 for preventing movement of the carriage longitudinally of the machine.

The carriage 260 is reciprocated transversely of the machine to position first one set of finishing molds in alignment with the parison mold unit and takeout mechanism and then to shift the carriage laterally of the machine to position the other set of finishing molds in alignment with the parison molds and takeout mechanism, while the parisons in the first set are being blown to final shape. Such reciprocation of the carriage is effected by means of an air motor 263, Figs. 1, 2 and 4, the piston rod 264 of which is connected to a lug 265 extending downwardly from the bottom of the carriage 260. The connection of the piston rod 264 with the carriage preferably is made adjustable so that proper alignment of the finishing molds with the other parts of the machine may be obtained. Air motor 263 has conduits 266 at its opposite ends for the admission and exhaust of air pressure to and from the spaces in the opposite ends of the air motor. The conduits 266 may be connected to the timer T so that the timer will control the reciprocation of the carriage in timed relation to the operation of the other parts of the machine.

Inasmuch as the two finishing mold units are substantially identical in construction and operation, a description of one of them will suffice for both.

Referring particularly to Figs. 2, 3, 7 and 8, it will be seen that mold holders 268 and 269 are slidably mounted between guides 270 on the carriage 260 and that the holders have semi-circular opposed recesses formed therein for receiving the mating sections 271 of the finishing molds. These molds may be of different sizes and/or shapes.

As is the case with the parison body molds, mechanism preferably is associated with the finishing molds whereby the failure of one or more of the finishing molds to close will not prevent the remaining molds from closing. To this end, a swingletree equalizing mechanism indicated generally at 272, Fig. 7, is mounted in the holder 268 for engagement with the sections of the molds carried thereby. This mechanism is substantially identical with the swingletree mechanism associated with the parison body molds and hence need not be described in detail.

The finishing molds are divided in a vertical transverse plane and are opened and closed by movement of the holders 268 and 269 away from and toward each other. Such movement of the holders is effected by means of an air motor 273 connected to a cross head 274, the ends of which have pivotal connections with links 275. Links 275 in turn are pivotally connected to arms 276 of double crank levers 277, pivotally mounted on the carriage 260 as indicated at 278. Arms 276 of the double crank arms also are connected by links 279 to the mold holders 268 so that reciprocation of air motor 273, which may be effected by the admission and exhaust of air to and from the opposite ends thereof through conduits 281 which preferably lead from the timer T, causes the holders 268 likewise to be reciprocated.

The other arms 282 of double crank arms 277 are connected by links 283 which, as is more clearly shown in Fig. 15, are in turn connected to blocks 284 adjustably secured to the outer ends of slide blocks 285 mounted in grooves 286 formed in the sides of the holders 268 and 269. Slide blocks 285 are connected at their inner ends to the holder 269 by means of pins 287, Fig. 3.

Thus it will be seen that connections are provided between the crank arms 277 and the holder 269 whereby reciprocation of air motor 273 will cause corresponding reciprocation of holder 269, but in a direction opposite to the direction in which the holder 268 is reciprocated. It also will be seen that the extent of movement of holder 269 may be varied by adjusting blocks 284 relative to the slide blocks 285 to which they are connected.

As shown in Figs. 1, 7, 8 and 10, each finishing mold has a bottom plate or closure 290 associated therewith, the molds being recessed as indicated at 291, Fig. 8, to close around the bottom plate. The bottom plates 290 are mounted on arms 292 carried by a transverse shaft 293, mounted in brackets 294 secured to the carriage 260 in a compartment 295 formed in the bottom thereof.

Figures 10, 11:
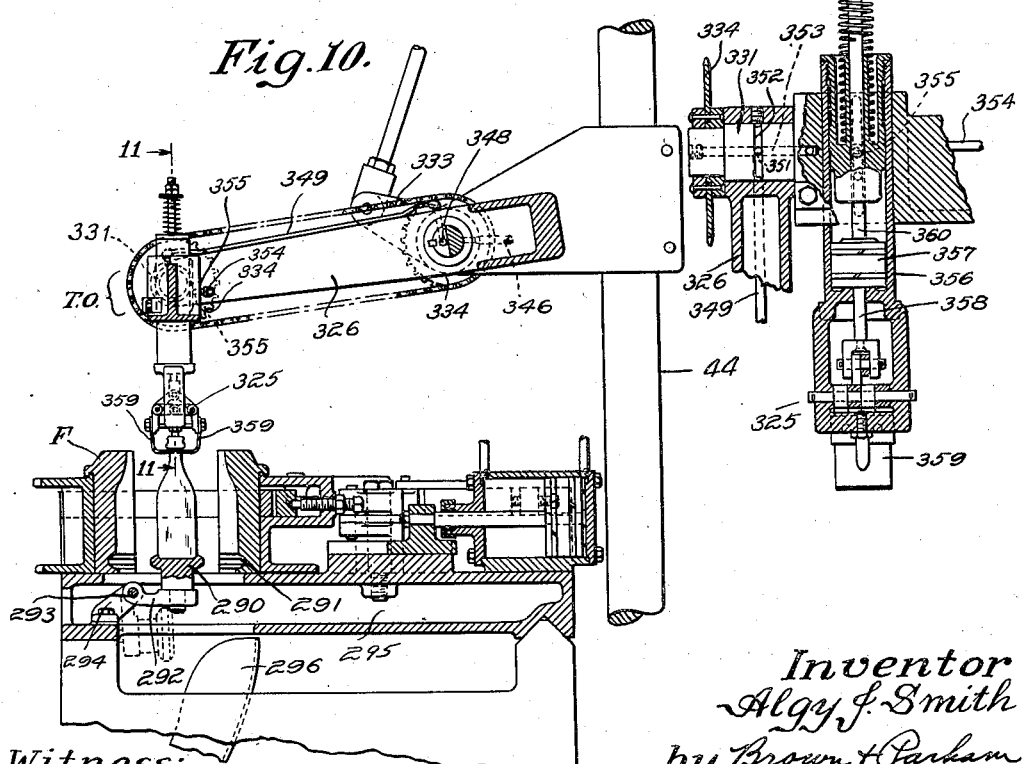
Fig. 10 is a view in longitudinal vertical section taken substantially on the line 10—10 of Fig. 3, and showing the engagement of the takeout mechanism with a finished article of glassware just after said article has been released by the finishing mold.
Fig. 11 is a still further enlarged view in transverse vertical section taken substantially on the line 11—11 of Fig. 10, and showing the construction of a tongs operating mechanism.

The bottom plate serves not only to support finished ware after the finishing molds have opened for engagement by the takeout mechanism, as illustrated in Fig. 10, but also to discharge defective ware or bits of glass (cullet) from the machine. To this end, the shaft 293 upon which the bottom plates are mounted is rocked to tilt the bottom plates into the positions in which one of them is shown in dotted lines in Fig. 10, whereby the defective ware will be dumped into one of the cullet chutes 296 arranged to receive the same. See Figs. 1, 2, 8 and 10. The tilting of the bottom plates is effected after the takeout mechanism has engaged and removed from the bottom plate such glassware as the takeout mechanism is able to grasp. The shaft 293 is rocked into and out of vertical position by means of an air motor 297, Figs. 1 and 3, the piston rod of which is connected by a link 298 to a crank arm on shaft 293. Air motor 297 has a conduit 299 connected thereto which may lead from the timer T for controlling the tilting of the bottom plates in timed relation to the operation of the finishing molds and takeout mechanism.

As will be understood, separate sets of bottom plates are associated with the finishing mold units, each of them having an air motor 297 for separately and independently controlling the operation of the two sets of bottom plates, see Fig. 3.

The blow head units B. H.

Two sets of blow heads are provided, one for each finishing mold unit, the blow head units being arranged over the end portions of the body 39 of the machine, as illustrated in Figs. 2 and 3. After one of the finishing mold units previously moved into alignment with the parison forming unit, has received parisons from the neck molds of said unit, the finishing mold carriage is shifted transversely of the machine to move said finishing mold unit into vertical alignment with the blow heads of the appropriate blow head unit. The blow head units being substantially identical in construction, a description of only one of them will be given.

The blow heads, there being four in each unit, one for each finishing mold, are supported near the inner ends of a frame 300 pivoted at its inner end at 301 upon the upper end of a bracket 302 secured to the outer surface of the inner side wall of the body 39 of the machine. The outer end of frame 300 is connected by a link 303 to the piston rod of an air motor 304. Air motor 304 has conduits 305 connected thereto which may lead from the timer T, whereby air may be admitted to and exhausted from the air motor to oscillate the frame 300 about its pivot and thus move the blow heads into and out of engagement with the finishing molds.

As shown in Fig. 3, the frame 300 has split sleeves 307 formed therein in which the blow head devices are adjustably mounted. Connected to the sleeves 307 are air supply conduits 308 which lead from an air supply manifold 309 to which blowing air is supplied through a conduit 310 which may be directly connected to the source of air pressure. The blow head devices proper are identical in construction, and hence a description of one of them will suffice for all.

Referring to Fig. 8, it will be seen that the split sleeve 307 receives a tubular member 312 in which a tubular rod 313 is slidably mounted. Connected to the bottom end of the tubular rod 313 by a swivel joint is the blow head 314. The swivel joint permits the blow head to adjust itself in air tight engagement with the appropriate finishing mold.

The rod 313 is urged downwardly relative to frame 300 by a compression spring 315 engaging the upper end of the rod 313 and contained in the tubular member 312, whereby the blow head 314 is yieldingly held against the top of the finishing mold. Downward movement of the rod and the blow head carried thereby is limited by nuts 316 on rod 317 connected to the upper ends of rod 313, and extending through the upper end of tubular member 312.

Air supply conduit 308 connected to the clamping sleeve 307, leads into a passageway 318 formed on the interior of the sleeve. When the frame 300 is oscillated downwardly to engage the blow head supported thereby with the appropriate finishing mold, each blow head device is forced upwardly against the pressure of spring 315 as a result of which, an annular groove 319 formed on the tubular rod 313, is moved into registry with a port 320 in the tubular member 312. This permits the blowing air from air supply conduit 308 to flow through groove 319, and vertical passageway 321 in rod 313, into the blow head 314.

The takeout mechanism T. O.

The takeout mechanism which comprises a plurality of tongs, indicated generally at 325, is similar in construction and operation to the mechanism which supports and operates the neck molds N. It comprises an arbor 326, Figs. 1, 3, 9, 10 and 11, mounted on shaft 327 journaled in brackets 328 secured to and extending inwardly of the posts 44 and 45 of the machine.

Figure 9:
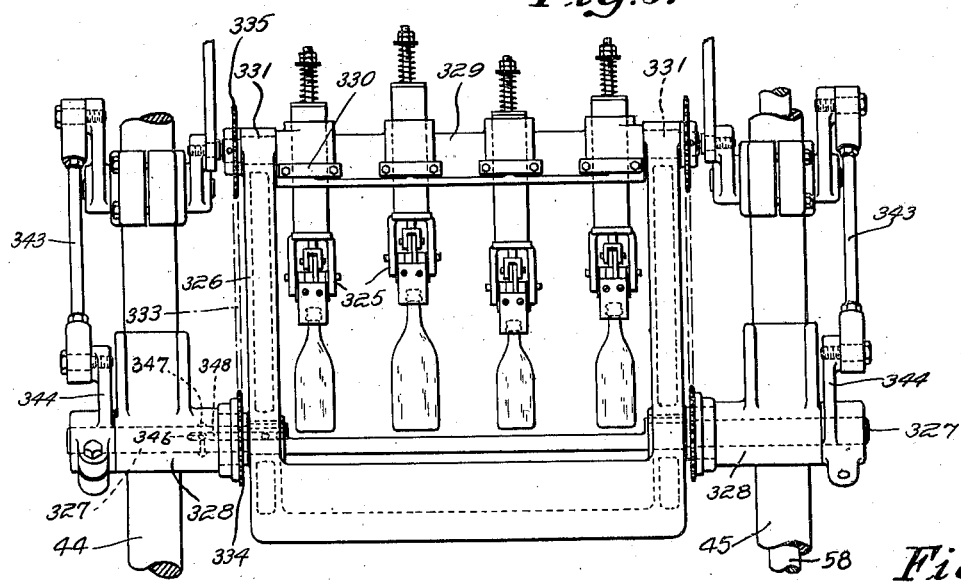
Fig. 9 is an enlarged view in front elevation of the takeout mechanism, showing said mechanism in vertical position.

The arbor 326 has mounted in the outer ends of the arms thereof, a carrier 329 in which the tongs 325 are adjustably secured by clamps 330, Fig. 9. The carrier 329 is provided with trunnions 331 journaled in the arms of the arbor as illustrated in Figs. 9 and 11. Thus, the carrier is mounted in the arbor for rotation relative thereto, so that the tongs and finished articles of glassware supported thereby may constantly be held in vertical position while the arbor is oscillated to swing the takeout mechanism from a position immediately above the finishing molds to a delivery station where the finished articles of glassware may be discharged to a suitable conveyor, as indicated at 332, Figs. 1 and 3.

The tongs are maintained in such vertical position by means of sprocket chains 333, which engage sprocket wheels 334 and 335 mounted respectively on the trunnions 331, and shaft 327. Thus, as the arbor 326 is oscillated, the chains 333 rotate the carrier 329 through corresponding angles, but in opposite directions, to maintain the tongs in vertical position.

As heretofore indicated, the takeout mechanism is operated by cams 216 and 217 on cam shaft 210. Motion is transmitted from the cams 216 and 217 to the arbor 326 by bell crank levers 336, Figs. 1 and 2, mounted for oscillation on transverse shaft 221, previously referred to. The upwardly extending arms of bell crank levers 336 carry cam rollers 337 which engage respectively the cams 213 and 214. The generally horizontal arms 338 of bell crank levers are connected at their outer ends to the depending links 339, the bottom ends of which are connected to arms 340 of bell crank levers pivoted in brackets 341 carried by the posts 44 and 45 of the machine. Arms 342 of the last-mentioned bell crank levers are in turn connected to links 343 which have pivotal engagement with crank arms 344 secured to the outer ends of shaft 327. Crank arms 344 are mounted on shafts 327 in angularly spaced relation to each other so that the arrival of one of the links 343 in dead center alignment with its crank arm will not stop the oscillation of the arbor 326.

Cams 216 and 217, which may be generally similar to cams 213 and 214 of the transfer mechanism, are so laid out as to cause the arbor 326 and the tongs carried thereby to be swung through an angle of sufficient length to move the tongs from the position in which they are shown, for example in Figs. 1 and 10, into a position to deliver the finished articles of glassware to the conveyor 332. The cams may provide for a brief dwell of the tongs above the finishing molds to permit the tongs to engage the finished ware supported uopn the bottom plates, and similarly may afford a brief dwell of the tongs in delivery position while discharging the finished ware to the conveyor 332.

The tongs 325 are pneumatically operated, and to this end, air connections are associated with the arbor 326, whereby the tongs may be opened and closed at appropriate times. As indicated in Figs. 9 and 10, an air supply conduit 346 is connected to the left-hand bracket 328, said conduit being in communication with an annular groove formed in the bearing in said bracket as indicated at 347, Fig. 9. Said groove in turn communicates with a passage 348 in shaft 327 and connected at its inner end to a conduit 349, Figs. 10 and 11, which extends outwardly along one arm of arbor 326 to where it is connected to a port 351 in the outer end of said arm. Said port 351 has communication with an annular groove 352 in a trunnion 331 of the carrier 329. Said annular groove 352 in the trunnion 331 communicates with a passageway 353 extending longitudinally through the trunnion to a point where said passageway turns outwardly through the carrier 329 and is joined to a manifold 354, Fig. 3, branches 355 of which lead to the various tongs operating mechanisms.

The tongs and associated operating mechanisms are identical in construction and hence only one of them will be described.

Referring to Fig. 11, it will be seen that a cylinder 356 forms the part of the tongs mechanism which is gripped by the clamp 330 of the carrier 329. Located in the cylinder 356 is a piston 357 having a downwardly extending rod 358 connected through suitable linkage to the grippers 359 of the tongs. Piston 357 also has an upwardly extending rod 360 which protrudes through the head of cylinder 356, where it is encircled by a compression spring 361. Admission of air pressure into the cylinder 356 above piston 357 moves the piston downwardly to open the tongs, and release of such pressure permits spring 361 to close the tongs and yieldingly hold them in closed position.

When the takeout mechanism is moved into a position such as that in which it is shown substantially in Figs. 1 and 10, air is admitted through conduit 346, which may be connected to timer T, as a result of which the grippers of the tongs are spread apart as they are lowered into a position to grasp the necks of finished articles of glassware, after which the air is released, preferably through the timer T, to permit the spring 361 to act, closing the tongs about the articles of glassware. After the takeout mechanism has been swung to the delivery station, the admission of air pressure to the various cylinders 356, as above explained, will serve to spread the grippers of the tongs apart, thereby releasing the finished articles of glassware to the conveyor 332.

Complete operation

A preferred mode of operating the apparatus above described and illustrated in the drawings is as follows:

First, the cover C for the gathering pool is retracted to open position by the action of cam 68, Fig. 4, or cam roller 76 of bell crank lever 70, to expose the gathering zone of the pool of glass in container G to the parison forming unit. The parison forming unit then is lowered simultaneously to dip the aligned parison body molds into contact with the glass, this operation being effected by the exhaust of air pressure from air spring 225 back through conduit 229 to permit carriage 110 to descend, under the action of cam 215 on the carriage reciprocating lever 220.

As will be understood, prior to the lowering of the parison forming unit, the neck molds and parison body molds will be closed and the neck plungers will be depressed. As the parison body molds contact with the glass in the gathering pool, the vacuum valves are opened by cam 174, Fig. 1, which oscillates lever 168 to rock the valve operating bar 163, Fig. 3. As a result, the parison body molds and neck molds are simultaneously charged with glass.

The parison forming unit now is elevated by the action of cam 215 a sufficient distance to permit cover C to be moved to closed position by air motor 67, Fig. 1. During such movement of the cover, shear blades 101 sever the tails from the charges in the molds, and scraper 36 is dipped into the glass and moved inwardly of the pool by the raising of frame 87, the arms 92 of which are thereby elevated, permitting the scraper to be lowered into contact with the glass. The cover is moved to closed position relatively quickly to cause the scraper to impel chilled spots of glass produced by the contact of the molds therewith, and the severed tails of glass inwardly of the gathering pool above the baffle 34 to where they may be reheated and reassimilated by the glass in the pool. Such chilled glass is replaced by fresh homogeneous glass which moves upwardly into the gathering zone from the bottom of the pool, the glass in the gathering area also being reheated as a result of the enclosure of the gathering pool by the cover. As will be understood, the cover C remains closed until the beginning of another gathering operation.

Cam 215 now acts to lower the parison forming unit to engage the bottoms of the parison body molds with the bottom plates 106. See Fig. 16. Up until this time, the application of vacuum to the molds preferably is maintained in order to set the neck finish of the charges in the neck molds and to hold the glass in contact with the walls of the mold cavities. Such application of vacuum now is terminated by the action of cam 174 on bell crank lever 168 which permits the vacuum valves to close. The neck pins or plungers also are retracted immediately after the vacuum valves are closed, by the operation of air motor 183 to permit preliminary blowing air introduced to the head H through conduit 177, to enter the cavities in the charges of glass formed by the neck pins, and force the charges of glass into contact with the walls of the mold cavities and with the recesses in the bottom plates, thereby forming complete parisons.

The parison forming unit now is raised to its uppermost position in which it is shown in Fig. 1, and the parison body molds are opened by the operation of air motor 137 to leave the parisons suspended from the neck molds. At this time, the cams 213 and 214 operate to swing arbor 111 on its trunnions, as a result of which, the neck molds and the parisons suspended therefrom are moved to the transfer station where one of the finished mold units awaits the arrival of the parisons. One of said units is shown in parison receiving position in Fig. 3, (the one at the left), the finishing molds previously having been opened to permit finished articles of glassware to be removed therefrom. As the arbor 111 reaches the end of its travel, the parisons are lowered between the sections of the finishing molds, the finishing molds are closed, and the neck molds are opened, releasing the parisons.

The arbor 111 is now swung back to its initial position into cooperative relation with the carriage 110 which has been held in its uppermost position in the meantime, the neck molds thereby being moved into a position for engagement with the parison body molds which are closed around them. The parison forming unit is again operated to gather charges of glass and to shape the charges into parisons, as previously explained.

In the meantime, the finishing mold carriage 260 is reciprocated transversely of the machine to position the charged finishing molds in vertical alignment with the blow heads of the appropriate blow head unit B. H. Referring to Fig. 3, it may be assumed that the finishing mold carriage is moved to the left to the end of its travel. The blow heads at the left of Fig. 3 now are lowered into engagement with the finishing molds by the operation of air motor 304, (Fig. 1).

The movement of the finishing mold carriage to the left results in the finishing mold unit at the right of Fig. 3 being aligned with the parison forming unit. This finishing mold unit now is opened to permit previously formed articles of glassware to be removed therefrom by takeout mechanism T. O. which is swung from the position in which it is shown in Fig. 1, to the delivery station where the finished articles are discharged to the conveyor 332, by the action of cams 216 and 217. Said cams are rotated at such a speed that the take-out mechanism alternately removes finished ware first from one of the finishing mold units and then from the other. As the finished glassware thus is removed from the finishing mold unit, the arbor 111 and the neck molds N from which parisons are suspended, which have been formed in the meantime, is swung to the transfer station, and the parisons are transferred to the finishing mold unit at the transfer station. The transfer and takeout operations may occur simultaneously.

The finishing mold carriage 260 now is moved to the right into the position in which it is shown in Fig. 3, whereupon the appropriate blow heads are moved into engagement with the finishing molds and the parisons are blown to final shape. Such movement of the carriage 260 returns the first finishing mold unit to the transfer station where previously finished glassware in said units is removed therefrom by the takeout mechanism, and another group of parisons supplied thereto by the parison forming unit.

Thus it will be seen that the parison forming unit operates through two cycles for each cycle of operation of one of the finishing mold units, as does also the takeout mechanism.

Such air or vacuum supply conduits as lead to moving parts of the machine may be connected to the sources of air or vacuum by means of flexible tubes in known manner, or by other known means, to permit such movement.

It is to be understood that various changes may be made in the details of construction of the apparatus illustrated in the drawings without departing from the scope of the appended claims.

Having thus described my invention, what I desire to claim and to secure by Letters Patent is:

1. In a container for a pool of molten glass having an opening therein through which a gathering receptacle may be projected to gather a charge by suction, a cover movable into and out of a position to close said opening, and glass severing means carried by said cover and operated by movement of said cover into closed position, to sever glass depending from the charge in said receptacle.

2. In combination with a container for a pool of molten glass having an opening therein through which a gathering receptacle may be projected to gather a charge of glass from the surface of said pool in a gathering zone, a cover movable into and out of position to close said opening, and means carried by said cover and operated thereby to circulate glass in said gathering pool away from said gathering zone.

3. In combination with a container for a pool of molten glass having an opening formed therein through which a gathering receptacle may be inserted to gather a charge of glass by suction, a cover movable into and out of position to close said opening, and a bottom plate mounted on said cover and movable therewith into a position for engagement by said gathering receptacle.

4. In apparatus for fabricating glassware, a mold carriage, a mold supported by said carriage, cam controlled means connected to said carriage for moving it toward and away from a gathering pool whereby the molds may be dipped in said pool and charged with glass by suction, means for supplying air under pressure to the apparatus, and means operable upon failure of air pressure for locking said carriage in raised position.

5. In apparatus for fabricating glassware, a parison forming unit comprising a parison body mold and a neck mold, a support for said neck mold mounted for oscillation about a horizontal axis, means for forming a parison in said parison body mold and neck mold, means for opening the parison body mold leaving the parison suspended from the neck mold, means for swinging neck mold support about its horizontal axis to move the neck mold and parison suspended therefrom to a transfer station, and means for maintaining said neck mold and parison in vertical position during the movement thereof to the transfer station.

6. In apparatus for fabricating glassware, transfer mechanism comprising a device for holding an article of glassware, a support for said holding device mounted for oscillation about a horizontal axis, cam actuated crank mechanism for swinging said support through an angle greater than 180°, and means for maintaining said glass holding device in vertical position during the swinging movement of said support.

7. In apparatus for fabricating glassware, a parison forming unit comprising a parison body mold and a neck mold, means for moving said parison body mold and neck mold toward and away from a gathering pool to charge said molds with glass by suction, means for shaping the charge of glass in said mold into a parison, means for opening the parison body mold leaving the parison suspended from the neck mold, means for vertically swinging the neck mold and parison suspended therefrom to a transfer station, and means for maintaining the neck mold and suspended parison in vertical position during the movement thereof to the transfer station.

8. In apparatus for forming glassware, a parison forming unit comprising a parison body mold and a neck mold, means for vertically moving said parison body mold and neck mold toward and away from a gathering pool to charge said molds with glass by suction, means for shaping the charge of glass in said molds into a parison, means for opening the parison body mold leaving the parison suspended from the neck mold, a support for the neck mold mounted for oscillation about a horizontal axis, means for pivotally mounting the neck mold in the support, means for swinging said support and the neck mold and parison suspended therefrom about said horizontal axis to move the neck mold and parison to a transfer station, means for opening the neck mold to release the parison at the transfer station, means for swinging said support and neck mold away from the transfer station to return the neck mold to a position for engagement with the parison body mold and means for maintaining the neck mold and parison in upright positions during the swinging movement of the support to the transfer station.

9. In apparatus for fabricating glassware, a parison forming unit comprising a vertically reciprocable carriage, a plurality of parison body molds mounted on said carriage, a neck mold carrier mounted in said carriage for oscillation about a horizontal axis, a plurality of neck molds supported by said carrier, means for lowering said carriage to dip the parison body molds into a pool of molten glass, means for simultaneously charging the parison body molds and associated neck molds with glass by suction, means for raising the carriage to move the parison body molds out of contact with the glass, a plurality of bottom plates, means for lowering the carriage to engage the bottoms of the parison body molds with the bottom plates, means for applying preliminary blowing air to the charges of glass in said molds to shape said charges into parisons, means for raising said carriage to disengage the parison body molds and bottom plates, means for simultaneously opening the parison body molds to leave the parisons suspended from the neck molds, cam actuated crank mechanism connected to the neck mold carrier for swinging said carrier and the neck molds and parisons suspended therefrom through vertical planes to a transfer station, means for maintaining the neck molds and parisons in vertical position during the movement thereof to the transfer station, and means for simultaneously opening the neck molds to release the parisons therefrom at the transfer station.

10. A glassware forming machine comprising a stationary frame, a glass gathering and parison forming unit carried by said frame, said unit comprising a parison body mold and a neck mold, means for successively moving said unit toward and away from a pool of glass to gather charges in said mold, means for successively forming the charges in said molds into parisons, a pair of finishing mold units mounted on the stationary frame of said machine, means for alternately positioning said finishing mold units at a transfer and take-out station, means for oscillating said neck mold to successively deliver parisons to alternate finishing mold units at said station, takeout mechanism for removing finished articles of glassware from said finishing mold units, and means for operating said takeout mechanism to successively remove finished articles of glassware from alternate finishing mold units as they arrive at said station for the reception of parisons.

11. A glassware forming machine comprising a stationary frame, a glass gathering and parison forming unit carried by said frame, said unit comprising a parison body mold and a neck mold, means for successively moving said unit toward and away from a pool of glass to gather charges of glass in said molds by suction, means for successively forming said charges of glass into parisons, a pair of finishing mold units, means for alternately and successively delivering parisons to said finishing mold units, means for blowing a parison in one of said units while said glass gathering and parison forming unit is operating to gather a charge of glass and shape the charge into a parison to be delivered to other of said units, takeout mechanism for removing finished articles of glassware from said finishing mold units, and means for operating said takeout mechanism whereby said mechanism alternately and successively removes finished articles of glassware from said finishing mold units.

12. A glassware forming machine comprising a stationary frame, a glass gathering and parison forming unit carried by said frame, said unit comprising a parison body mold and a neck mold, means for successively moving said unit toward and away from a pool of glass to gather charges of glass in said molds by suction, means for successively forming said charges of glass into parisons, a finishing mold carriage mounted for reciprocation transversely of the machine, a plurality of finishing molds on said carriage, means for reciprocating said carriage transversely of the machine whereby said finishing mold units alternately are moved toward and away from a transfer station, means for moving said neck mold longitudinally of the machine alternately to deliver parisons to the finishing mold units at said transfer station, means for blowing the parisons to final shape in one of said finishing mold units after said unit has been moved away from the transfer station and while a charge of glass is being gathered in said parison forming unit and shaped into a parison therein for the other of said finishing mold units, and means for alternately removing finished articles of glassware from said finishing mold units as said units are successively and alternately moved to the transfer station and prior to the alternate delivery of parisons thereto.

13. A glassware forming machine comprising a stationary frame, a parison forming unit carried by said frame, said unit comprising a plurality of parison body molds and a plurality of neck molds, means for successively moving said unit toward and away from a gathering pool to simultaneously and successively gather a plurality of charges of glass by suction in said molds, means for forming said charges of glass into parisons, a pair of finishing mold units, each of said units comprising a plurality of finishing molds, means for alternately moving said finishing mold units toward and away from a transfer station, means connected to said neck molds for alternately effecting the transfer of a plurality of parisons from the parison body molds to the finishing molds of one of the finishing mold units at the transfer station, means for simultaneously blowing the parisons in the finishing mold unit to final shape while charges of glass are being gathered in the parison forming unit and shaped into parisons therein for the other of said parison forming units, and means for alternately removing a plurality of articles from the finishing mold units when said units alternately are moved to the transfer station and prior to the delivery of a plurality of parisons thereto.

14. A glassware forming machine comprising a stationary frame, a parison forming unit mounted on said frame, said unit comprising a vertically movable carriage, a parison body mold carried by said carriage, a neck mold movable into and out of cooperative relation with the parison body mold, means for lowering the carriage toward a gathering pool to charge the parison body mold and neck mold with glass by suction, means for elevating the carriage, a bottom plate movable into a position below the parison body mold, means for lowering the carriage to engage the parison body mold with the bottom plate, means for applying preliminary blowing air to the charge of glass in said mold to form a parison, means for raising the carriage to disengage the parison body mold and bottom plate, a plurality of finishing mold units, means for alternately moving said units toward and away from a transfer station, a support for said neck mold mounted for oscillation about a horizontal axis, means for successively oscillating said support to alternately transfer parisons from the parison body mold to one of the finishing mold units at the transfer station, means for alternately blowing parisons to final shape in the finishing mold units, and takeout mechanism for alternately removing finished glassware from said finishing mold units, said mechanism comprising a takeout device, a support mounted for oscillation about a horizontal axis upon which said takeout device is mounted, and means for oscillating said support to move said takeout device from a position where said device engages a finished article of glassware in a finishing mold unit, to a position where said finished article of glassware is discharged from said takeout device.

ALGY J. SMITH.